United States Patent [19]

Jolley

[11] 4,177,598
[45] Dec. 11, 1979

[54] FISHING LURE HOOK UP SWIVEL

[76] Inventor: Kenneth A. Jolley, 9318 A Maryland St., Wurtsmith AFB, Mich. 48753

[21] Appl. No.: 900,341

[22] Filed: Apr. 27, 1978

[51] Int. Cl.² ............................................ A01K 91/04
[52] U.S. Cl. ..................................... 43/42.49; 24/223; 43/44.86; 43/44.93; 43/44.95
[58] Field of Search .................... 43/44.83, 44.86, 44.9, 43/44.91, 44.92, 44.93, 44.95, 44.98, 42.49, 42.08, 42.48; 24/223

[56] References Cited

U.S. PATENT DOCUMENTS

| | | | |
|---|---|---|---|
| 1,771,125 | 7/1930 | Kahle | 43/44.83 |
| 2,305,234 | 12/1942 | Bratz | 24/223 |
| 2,763,089 | 9/1956 | McDonald | 43/44.86 |
| 2,772,902 | 12/1956 | Lind | 43/42.49 X |
| 2,869,278 | 1/1959 | Cook | 43/44.86 |
| 3,023,538 | 3/1962 | Cameron | 43/44.95 |
| 3,148,423 | 9/1964 | Anspach | 43/44.83 X |
| 3,641,698 | 2/1972 | Varaney | 43/42.48 |
| 3,988,852 | 11/1976 | Klein | 43/44.91 |

*Primary Examiner*—Nicholas P. Godici

*Attorney, Agent, or Firm*—Cullen, Sloman, Cantor, Grauer, Scott & Rutherford

[57] ABSTRACT

A fishing lure hook up swivel is provided for coupling a ball-like element provided on one end of the fish line to a fish lure whereby the lure can rotate relative to the line. The swivel is provided with a solid body or receiver shaft having at one end thereof a ball recess and a slot leading into a bore for receiving the ball-like element and the line respectively. A coil spring carried by the body provides a removable closure or cage for retaining the ball-like element and line in the recess and bore respectively to permit the fish lure to rotate relative to the line. The other end of the receiver shaft is provided with an "O" ring to which the lure is securely attached. This construction permits or allows for instant line-lure connection and permits even a novice to rapidly exchange the lure on the line when required by (a) compressing the spring, (b) removing the ball-like element and line from the combined swivel and lure, and (c) thereafter connecting the element and line to a different swivel to which another lure is attached.

11 Claims, 7 Drawing Figures

FISHING LURE HOOK UP SWIVEL

BACKGROUND OF THE PRESENT INVENTION

1. Field of the Invention

This invention relates generally to the sport of fishing and more particularly to an improved hook up swivel for connecting a fishing lure to a line. The swivel can be used by skilled fishermen and by novices to make fishing more enjoyable.

2. Description of the Prior Art

The prior art teaches many different ways of connecting a fishing lure to a fish line. It is generally necessary that a person be somewhat skilled in order to connect the lure to the line rapidly and expeditiously.

SUMMARY OF THE INVENTION

It is a feature of the present invention to provide a hook up swivel for rapidly coupling a ball-like element provided on one end of a fish line to a fish lure whereby the lure can rotate relative to the line.

Another feature of the present invention is to provide a hook up swivel to which the fish lure is securely attached and cannot come loose, with the swivel and fish lure being removed as a unit from the line when it is required to use another fishing lure, provided with its own swivel, on the ball-like element of the line.

Still another feature of the present invention is to provide a hook up swivel comprising an elongated, generally solid body having an axis and a pair of end portions, with the body having adjacent one end portion a generally flat surface through which the axis extends and means carried by the other end portion of the body to which the fish lure is adapted to be attached.

A further feature of the present invention is to provide a hook up swivel of the aforementioned type wherein an outwardly opening ball recess is provided in the body which is spaced from the flat surface and intersects the axis, a bore provided in the body which extends from the flat surface along the axis of the recess and a slot in the body intersecting the bore throughout its length and also extending from the flat surface to the recess.

A still further feature of the present invention is to provide a hook up swivel of the aforementioned type wherein the ball recess forms a receiver for the ball-like element and the slot forms an entrance to the bore for the fish line.

Another feature of the present invention is to provide a hook up swivel of the aforementioned type wherein closure means is carried by the body and adapted for retaining the ball-like element and line in the recess and bore respectively to permit the fish lure to rotate relative to the line.

Still another feature of the present invention is to provide a hook up swivel of the aforementioned type wherein the closure means is in the form of a retractable coil spring which is sleeved over the body and overlies the recess and the slot.

A further feature of the present invention is to provide on one end of the fish line a ball-like element having a center opening through which the line extends, with the line being tied and secured to the ball-like element by a knot.

A still further feature of the present invention is where the ball-like element is color coded to indicate the predetermined maximum load to which the fish line may be subjected.

It is a feature of the present invention to provide a combined fish line, fish lure and hook up swivel in which the fish lure and hook up swivel form a readily removable combined lure unit which may be readily replaced on the first fish line with another combined lure unit or where a second fish line may be used with the combined lure unit removed from the first line.

Another feature of the present invention is to provide a hook up swivel for a fishing lure which is simple in construction, easy to manufacture and is efficient in operation.

IN THE DRAWINGS

DESCRIPTION OF THE PREFERRED EMBODIMENT

Figure 1:
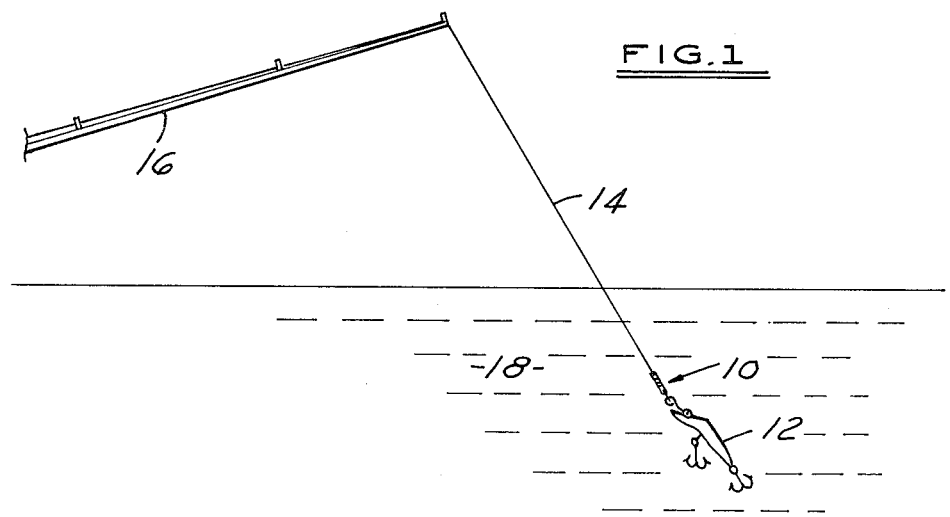
FIG. 1 is a fragmentary elevational view of a fishing rod and line to which a lure is secured by the hook up swivel for the present invention.

The present invention relates to a hook up swivel and more particularly to an instant hook up swivel identified by the numeral 10 which connects a conventional fishing lure 12 to the fish line 14. The fish line 14 is carried by a fishing rod 16 in the usual manner well known in the art. The fishing rod 16 carrying the line 14, swivel 10 and lure 12 can be used by skilled fishermen and novices alike. Generally, no weights or other paraphernalia are required on the line 14 although ball sinkers and other devices could be used by the fisherman if desired or should the conditions encountered in the water require such use. The fisherman utilizes the rod 16 in a conventional manner by extending the line 14 and lure 12 into the water 18. The swivel 10 couples a new and novel ball-like element 19, provided on one end of the fish line 14 to the lure 12 whereby the lure 12 can rotate relative to the line 14 without twisting the line 14.

Each fishing lure 12 utilized by the fisherman is provided with its own hook up swivel 10. When the fisherman wants to utilize another lure 12 for any reason, he selects the new lure, which is provided with its own swivel, and replaces it on the original fish line rapidly and expeditiously as will subsequently appear.

It is known that the fishing lines 14 are rated according to the loads they are capable of carrying without failure. Each fishing line representing a different load or rating will have the ball 19 on one end of a color different from the other differently rated lines. In other words, the balls 19 will be color coded with one color representing a designated rated line. If the ball-like element is red, it indicates a line which may be subjected to a 17 to 20 pound load; if the ball-like element is white, it indicates a line which may be subjected to a 10 to 14 pound load; and if the ball-like element is blue, it indicates a line which may be subjected to a 4-8 pound load.

Figure 7:
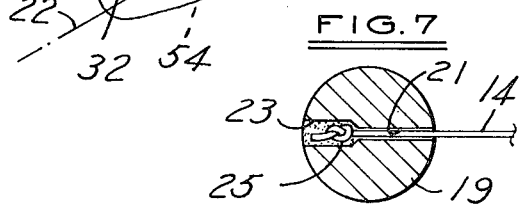
FIG. 7 is a sectional view through the ball-like element or head and illustrating the manner of connecting the fish line thereto by using a half knot.

Each ball or ball-like element 19 regardless of color is of the same outside diameter as the others. The colors will be different to indicate the strength or rating of the lines. Each ball 19, as shown in FIG. 7, has a through passage 21 which is drilled to match the size of the line 14. The outer end of the passage 21 is counterbored or enlarged at 23 as noted in FIG. 7. The line 14 extends through the passage 21 and is thereafter provided with an enlarged half knot 25, which is generally larger than the diameter of the hole 21, whereby the line 14 is now tied to the head or ball 19. The outer end of the line 14 adjacent the knot 25 may be cut off. Thereafter, in certain cases, the knob 25 is pulled inside of the ball 19 and is fixedly secured to the head or ball 19 by placing one or two drops of Super Glue brand glue in the counterbore 23 so as to permanently secure the knot 25 of the line 14 to the head 19. As an example, each ball 19 has a diameter of 0.0787 inch and the hole in each ball is of a size to accept the particular line 14.

The hook up swivel 10 comprises a generally elongated solid body or receiver shaft 20, of unitary construction and of generally cylindrical configuration. The body 20 has a longitudinal axis 22 and is made from a relatively hard plastic material such as nylon. The body 20 has a diameter, as an example, of 9/64 inch and a length of 11/16 inch. The body 20 includes a pair of end portions 24, 26 with the body 20 having adjacent end portion 24 a generally flat end surface 28 through which the axis 22 extends. End surface 28 represents the front face of the body 20. Axis 22 is perpendicular to the front end surface 28.

Figure 3:
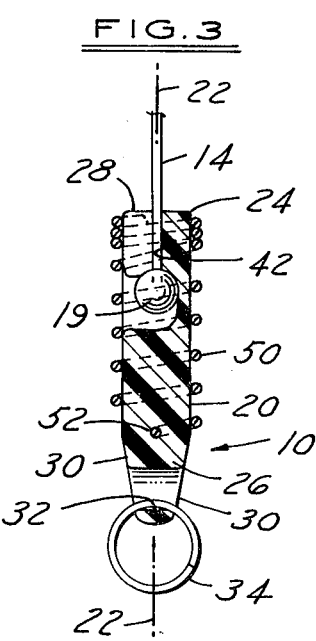
FIG. 3 is a vertical sectional view taken on the line 3—3 of FIG. 2.
Figure 4:
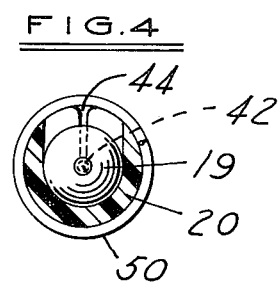
FIG. 4 is a horizontal sectional view taken on the line 4—4 of FIG. 2.

The body 20 at the back end portion 26 is provided with a pair of generally flat surfaces or surface areas or zones 30 which taper towards one another and towards axis 22 as best illustrated in FIG. 3. The taper starts approximately one-half inch from the back end. A transverse hole 32 is provided which extends through the body 20 and intersects axis 22. The hole 32 carries an O-ring 34 to which the fishing lure 12 is secured. The O-ring may be of various types as for example, a "DURA-A-PAK" O-ring Number 2 made from steel may be used. Such ring is forced upon and turned into the shaft hole 32. The O-ring 34, also referred to herein as a ring-like element, has a diameter which is larger than the diameter of the cylindrical body 20 as best illustrated in FIG. 3.

The front end portion 24 of the body 20 is provided with an outwardly opening ball recess or hole 40 which is spaced from the flat front surface or face 28 and which intersects the longitudinal axis 22. The receiver shaft or body 20 includes a bore 42 which extends from the flat front surface 28 along the axis 22 to the recess 40.

Figure 5:
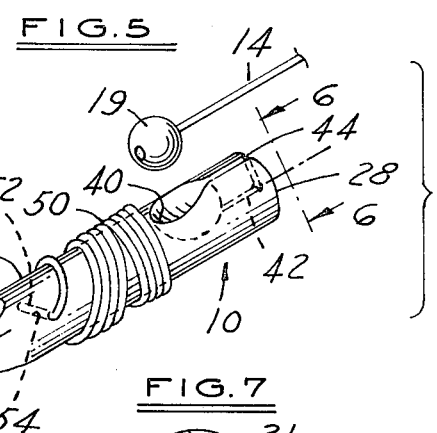
FIG. 5 is a perspective view illustrating the manner of connecting the ball-like element on the fish line to the hook up swivel.
Figure 6:
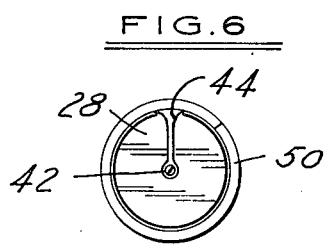
FIG. 6 is an end view of the swivel looking in the direction of line 6—6 of FIG. 5.

A slightly tapered slot 44 is provided in the body 20 which intersects the bore 42 throughout its length and which also extends from the flat front surface 28 to the ball recess 40. With such a construction, the ball recess 40 forms a receiver for the ball-like element 19 provided on the end of the fishing line 14 and the slot 44 forms an entrance to the bore for the fish line 14 as best illustrated in FIG. 5. As an example, the ball hole or recess 40 has a diameter of 7/64" and a depth of 5/64". The bore 42 has a diameter of 1/32", while the slot 44 has a width of 1/32", while the slot 44 has a width of 1/32" at the outer surface of body 20 and tapers downwardly to a width of about 1/64".

Figure 2:
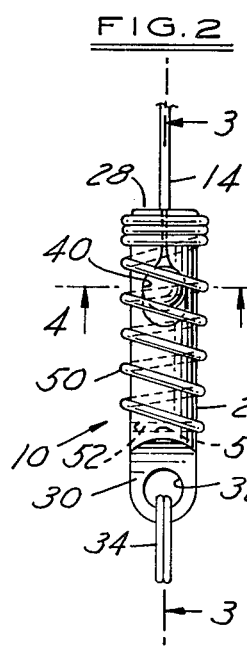
FIG. 2 is a side elevation of the hook up swivel.

Closure means in the form of a retractable coil spring 50 is carried by the receiver shaft or body 20. One end 52 of the spring 50 extends into and is anchored in or pressed into an opening 54 provided in the shaft 20. The remaining portion of the coil spring 50 is wrapped around the receiver shaft 20 and when in a non-compressed state overlies the recess 40 and slot 44 as shown in FIGS. 2 and 3. With such a construction the coil spring 50 forms a closure or cage for retaining the ball-like element 19 and line 14 in the recess 40 and bore 42 respectively.

As an example, the spring 50 has a length of ⅜" and an inside diameter of 9/64". The spring 50 has approximately 9½ turns of copper or steel wire having a 1/32" diameter. The first 3½ turns adjacent the front surface 28 are tight together as shown in FIGS. 2 and 3 while the remaining six turns or convolutions are spaced 1/16" apart as shown.

When it is required to replace the line 14 or to remove the combined swivel 10 and lure 12 from the line 14, the spring is urged in a direction to urge or move the spring convolutions closer together whereby the spring 50 no longer encircles or encloses the ball recess 40 and slot 44 as shown in FIG. 5. Thereafter the ball 19 and line 14 are removed from the combined swivel-lure unit. A differently rated line as shown by the color of the ball 19 may be now used with the same combined swivel-lure unit or a new swivel-lure unit may be attached to the previously used line 14.

As an example, the ball heads 19 may be made from chrome steel, a hard plastic, nylon or steel. The retractable coil spring 50 may be made from copper or stainless steel to prevent rust.

In operation and use, a swivel 10 is attached to each of the fisherman's lures via the O-ring 34. Once the swivel 10 is attached to a lure they remain together and are not separated. Also each fishing line is permanently provided with a ball of a predetermined color which represents the strength rating of the line.

Initially, the coil spring 50 is retracted (as in FIG. 5) or is pulled toward the rear of the shaft or body 20 and the properly rated ball 19 is placed into the shaft ball hole or recess 40. The spring 50 is thereafter released and the line 14 is pulled tight into the line hole or counterbore 23. The lure 12 is securely attached to the O-ring 34 of swivel 10 and cannot come loose. Such a construction permits instant line/lure connection and rapid exchange of lures when required.

Further, the ball 19 turns freely inside the expanded spring 50 (FIGS. 2 and 3), keeping the line from twisting. The ball 19 on the line 14 can pass through the rod line guides enabling the reel to be detached from the rod. Once the ball 19 is secured on the line 14, there is no need or requirement to ever cut the line 14 or to tie fancy knots.

The present invention makes fishing more enjoyable and permits any novice to securely attach a lure to a swivel and the combined unit to a line. The instant hook up swivel is relatively small and has no effect on lure action. The swivel is designed for lures that weigh one eighth to one ounce.

I claimed:

1. A hook up swivel for coupling a ball-like element provided on one end of a fish line to a fish lure whereby the lure can rotate relative to the line, said hook up swivel comprising an elongated generally solid body which is of generally cylindrical configuration, said body having an axis and a pair of end portions, said body being made from a hard plastic material, said body having adjacent one end portion a generally flat surface through which said axis extends and which is perpendicular thereto, the other of said end portions having opposing flat tapered surface areas on opposite sides of said axis, an outwardly opening ball recess in said body which is spaced from said flat surface and intersects said axis, a bore provided in said body which extends from said flat surface along said axis to said recess, a slot in said body intersecting said bore throughout its length and also extending from said flat surface to said recess, said ball recess forming a receiver for the ball-like element and said slot forming an entrance to said bore for the fish line, an aperture extending through said body and said flat tapered surface areas, a ring-like element extending through said aperture and to which the fish lure is adapted to be attached, and closure means carried by said body and adapted for retaining the ball-like element and line in said recess and bore respectively to permit the fish lure to rotate relative to the line, said closure means being in the form of a retractable coil spring which is sleeved over said body and overlies said recess and said slot, said coil spring having one end anchored to said body, said spring being adapted to retain the ball-like element and the line in said recess and said bore respectively.

2. The hook up swivel defined in claim 1 wherein said plastic material is nylon.

3. The hook up swivel defined in claim 1 wherein said aperture has an axis which is perpendicular to said first mentioned axis, said ring-like element having a diameter which is larger than the diameter of said body.

4. The combination of a fish line, a fish lure and a hook up swivel adapted to couple the lure to the line whereby the lure can rotate relative to the line, one end of said fish line being provided with a ball-like element, said hook up swivel comprising an elongated generally solid body which is of generally cylindrical configuration, said body having an axis and a pair of end portions, said body being made from a plastic material, said body having adjacent one end portion a generally flat surface through which said axis extends and which is perpendicular thereto, the other of said end portions having opposing flat tapered surface areas on opposite sides of said axis, an outwardly opening ball recess in said body which is spaced from said flat surface and intersects said axis, a bore provided in said body which extends from said flat surface along said axis to said recess, a slot in said body intersecting said bore and extending from said flat surface to said recess, said ball-like element being located in said ball recess, with said fish line entering said bore through said slot, an aperture extending through said body and said flat tapered surface areas, a ring-like element extending through said aperture and to which said fish lure is attached, and closure means carried by said body for retaining said ball-like element and said line in said recess and in said bore respectively to permit the fish lure to swivel relative to the line, said closure means being in the form of a retractable coil spring having one end anchored to said body, with said spring overlying said recess and said bore to retain said ball-like element and said line therein respectively.

5. The combination defined in claim 4 wherein said ball-like element has a center opening through which the line extends, with the line provided with a knot to retain the ball-like element on the line.

6. The combination defined in claim 4 wherein said ball-like element has a center opening through which the line extends, with the line being secured to the ball-like element by glue.

7. The combination defined in claim 4 wherein said ball-like element is color coded to represent a line subjected to a predetermined load.

8. The combination defined in claim 7 wherein said ball-like element is red to indicate a line which may be subjected to a 17 to 20 pound load.

9. The combination defined in claim 7 wherein said ball-like element is white to indicate a line which may be subjected to a 10 to 14 pound load.

10. The combination defined in claim 7 wherein said ball-like element is blue to indicate a line which may be subjected to a 4 to 8 pound load.

11. The combination defined in claim 4 wherein said aperture has an axis which is perpendicular to said first mentioned axis, said ring-like element having a diameter which is larger than the diameter of said body.

* * * * *